United States Patent [19]
Yale

[11] Patent Number: 5,958,295
[45] Date of Patent: Sep. 28, 1999

[54] TERBIUM-ACTIVATED RARE EARTH OXYSULFIDE PHOSPHOR WITH ENHANCED BLUE EMISSION

[75] Inventor: Ramon L. Yale, Ulster, Pa.

[73] Assignee: Osram Sylvania Inc., Danvers, Mass.

[21] Appl. No.: 08/936,445

[22] Filed: Sep. 24, 1997

[51] Int. Cl.$^6$ ........................... C09K 11/84
[52] U.S. Cl. ........................... 252/301.4 S
[58] Field of Search ........................... 252/301.4 S

[56] References Cited

U.S. PATENT DOCUMENTS 3,904,546  9/1975  Mattis et al. ........................... 252/301.4 S

FOREIGN PATENT DOCUMENTS

WO 85/04179  9/1985  WIPO .

*Primary Examiner*—Melissa Bonner
*Attorney, Agent, or Firm*—Robert F. Clark

[57] ABSTRACT

A terbium-activated rare earth oxysulfide phosphor with an enhanced blue emission is disclosed. The phosphor includes a rare earth oxysulfide matrix of the nominal formula $M_{2-x}O_2S:xTb$, where M is lanthanum, gadolinium, yttrium, scandium, lutetium, or mixtures of these metals, and x is 0.001–0.2. Copper is incorporated in the matrix to enhance the blue emission of the phosphor. A method of enhancing the blue emission is also disclosed.

13 Claims, No Drawings

TERBIUM-ACTIVATED RARE EARTH OXYSULFIDE PHOSPHOR WITH ENHANCED BLUE EMISSION

BACKGROUND OF THE INVENTION

The present invention relates to rare earth oxysulfide particulate materials, and particularly relates to terbium-activated rare earth oxysulfide phosphors exhibiting an enhanced blue emission as well as a method for producing such enhancement.

Rare earth oxysulfides have long been recognized in the art as valuable luminescent materials. These phosphors are in the form of a solid solution having a matrix of the rare earth oxysulfide compound with a small amount of an activator or dopant dispersed throughout the matrix. The activator normally is also a rare earth element.

Among such rare earth activated rare earth oxysulfides is the blue-green emitting terbium-activated rare earth oxysulfide having the nominal formula:

$$M_{2-x}O_2S:xTb \qquad (1)$$

where x is 0.001 to 0.2. The matrix rare earth metal element (M in Formula 1) in this phosphor typically is gadolinium, lanthanum, yttrium, scandium, lutetium, or mixtures of these metals.

The phosphor is useful, e.g., in the field of x-ray intensifier screens. However, the spectral sensitivity of the x-ray film does not always precisely match the phosphor emission. Thus, it would be desirable to have the capability to adjust the green and/or blue emission of the phosphor to tailor the phosphor emission to the spectral sensitivity of the x-ray film.

Accordingly, it is an object of the present invention to provide a terbium-activated rare earth oxysulfide phosphor which overcomes the disadvantages of the prior art.

It is another object of the invention to provide a terbium-activated rare earth oxysulfide phosphor in which the blue emission of the phosphor is enhanced.

It is yet another object of the invention to provide a terbium-activated rare earth oxysulfide phosphor in which the phosphor emission can be tailored to match to the spectral sensitivity of a particular x-ray film.

It is still another object of the invention to provide a method of enhancing the blue emission of a terbium-activated rare earth oxysulfide phosphor.

SUMMARY OF THE INVENTION

In accordance with these objects, in one aspect the invention is a terbium-activated rare earth oxysulfide phosphor with an enhanced blue emission. The phosphor includes a rare earth oxysulfide matrix of the nominal formula $M_{2-x}O_2S:xTb$, where M is at least one rare earth element selected from lanthanum, gadolinium, yttrium, scandium, and lutetium, and x is 0.001–0.2. An amount of copper sufficient to enhance the blue emission of the phosphor is incorporated in the matrix. An amount of about 0.3–0.5 ppm of copper is preferred.

In another aspect, the invention is a method of enhancing the blue emission of a terbium-activated rare earth oxysulfide phosphor including a rare earth oxysulfide matrix of the formula $M_{2-x}O_2S:xTb$, where M is at least one rare earth element selected from lanthanum, gadolinium, yttrium, scandium, and lutetium, and x is 0.001–0.2. The method involves incorporating into the matrix an amount of copper sufficient to enhance the blue emission, preferably 0.3–0.5 ppm. Preferably, the copper is added to the starting formulation at a weight selected to achieve the desired amount.

For a better understanding of the present invention, together with other objects, features, advantages, and capabilities thereof, reference is made to the following Description and appended claims.

DETAILED DESCRIPTION OF THE PREFERRED EMBODIMENTS

As used herein, the term "phosphor" refers to a material capable of exhibiting luminescence when subjected to proper excitation. The phosphors described herein are terbium-activated rare earth oxysulfide phosphors. Also as used herein, the term "rare earth" refers to any of scandium, yttrium, lanthanum, cerium, praseodymium, neodymium, samarium, europium, gadolinium, terbium, dysprosium, holmium, erbium, thulium, ytterbium, lutetium, and mixtures thereof. In the phosphors described herein, however, the metal component of the phosphor matrix (M in Formula 1) is gadolinium, lanthanum, yttrium, scandium, lutetium, and mixtures thereof. The preferred matrix metal component is gadolinium. The term "enhanced" as used herein is intended to mean "increased" or "made greater."

It has been found that adding a minute amount of copper to terbium-activated rare earth oxysulfide phosphors represented by the nominal formula $M_{2-x}O_2S:xTb$ (designated above as Formula 1) where M is gadolinium, lanthanum, yttrium, scandium, lutetium, and mixtures thereof, and x is 0.001 to 0.2, during their synthesis can significantly alter the blue emission of the phosphor. Adding a sufficient amount of copper, preferably about 0.3–0.5 ppm (parts per million) to these phosphors enhances the blue emission as measured by the x-ray optical fluorescence (XOF).

The copper is added to the starting formulation in the form of a powdered copper compound which will leave no residue after firing and washing of the phosphor. Alternatively, the copper compound is selected to leave a residue which will not significantly affect the other properties of the finished phosphor. Examples of copper compounds suitable for the phosphor starting formulation include, but are not limited to copper sulfate ($CuSO_4$), copper oxide (CuO), and copper sulfide (CuS). The copper compound is added to the starting formulation for the phosphor and thoroughly blended by any means known in the art for blending such phosphors. The weight percent of copper required to produce the desired alteration of the blue emission of a particular terbium-activated rare earth oxysulfide phosphor may be empirically determined. The powders are then fired in known manner, e.g., at 1000–1400° C. to produce the phosphor having the desired degree of alteration in its blue emission.

The following Example is presented to enable those skilled in the art to more clearly understand and practice the present invention. The Example should not be considered as a limitation upon the scope of the present invention, but merely as being illustrative and representative thereof.

EXAMPLE

The starting powder formulation for Sample 1, shown in Table I, was combined and thoroughly blended by mixing with 250 cc of ⅜" alumina bead in a 1 liter plastic bottle (a Nalgene bottle) for 15 min on a Red Devil Shaker.

TABLE I

| | |
|---|---|
| $Gd_2O_3$ | 289.1 g |
| $Tb_4O_7$ | 0.897 g |
| $Na_2CO_3$.anhydrous | 72.08 g |
| Sulfur | 76.80 g |
| $Na_2HPO_4$ | 22.72 g |
| $CuSO_4$ | 0.143 g (0.3 ppm Cu) |

This sample included 0.25 weight % terbium. A similar formulation, Sample 2, was prepared including 0.295 weight % terbium and 0.5 ppm copper. Control samples 1 and 2 were prepared including 0.25 and 0.295 weight % terbium, respectively, but no copper. The powder mixtures were placed in an alumina crucible, covered, and fired at 1200° C. in a gas fired or electric furnace for 3 hours to produce the phosphor. The samples were cooled and washed with de-ionized water to remove any soluble by-products. The samples were dried for 2–4 hours at 100–150° C., then heated in ambient air for 2 hours at 580° C. Three sets of each of Sample 1 and Control 1, and 2 sets of each of Sample 2 and Control 2 were prepared.

The samples were then sieved and the XOF brightness of each phosphor was measured. The blue emission of each sample and control is given in Table II. As shown in Table II, the brightness of the blue emission increases with the inclusion of copper.

TABLE II

| | | XOF Blue Brightness | | |
|---|---|---|---|---|
| Sample | ppm Cu | Set 1 | Set 2 | Set 3 |
| Control 1 | 0 | 100 | 100 | 100 |
| Sample 1 | 0.3 | 104 | 102 | 106 |
| Control 2 | 0 | 100 | 100 | |
| Sample 2 | 0.5 | 105 | 103 | |

The invention described herein presents to the art novel, improved terbium-activated rare earth oxysulfide phosphors in which the blue emission may be enhanced.

While there has been shown and described what are at present considered the preferred embodiments of the invention, it will be apparent to those skilled in the art that modifications and changes can be made therein without departing from the scope of the present invention as defined by the appended claims.

We claim:

1. A terbium-activated rare earth oxysulfide phosphor with an enhanced blue emission, said phosphor comprising: a rare earth oxysulfide matrix of the nominal formula:

$$M_{2-x}O_2S:xTb$$

wherein M is at least one rare earth element selected from the group consisting of lanthanum, gadolinium, yttrium, scandium, and lutetium, and x is 0.001–0.2; and an amount of copper sufficient to enhance the blue emission of the phosphor incorporated in said matrix.

2. A phosphor in accordance with claim 1 wherein said amount is between about 0.3 ppm and 0.5 ppm.

3. A phosphor in accordance with claim 2 wherein x is between about 0.0025 and 0.00295.

4. A phosphor in accordance with claim 3 wherein said amount is about 0.3 ppm and x is about 0.0025.

5. A phosphor in accordance with claim 3 wherein said amount is about 0.5 ppm and x is about 0.00295.

6. A phosphor in accordance with claim 1 wherein M is gadolinium.

7. A method of enhancing the blue emission of a terbium-activated rare earth oxysulfide phosphor comprising a rare earth oxysulfide matrix of the formula:

$$M_{2-x}O_2S:xTb$$

wherein M is at least one rare earth element selected from the group consisting of lanthanum, gadolinium, yttrium, scandium, and lutetium, and x is 0.001–0.2, said method comprising:

incorporating an amount of copper sufficient to enhance the blue emission of the phosphor into said matrix.

8. A method in accordance with claim 7 wherein said amount is between about 0.3 ppm and about 0.5 ppm.

9. A method in accordance with claim 8 wherein x is between about 0.0025 and 0.00295.

10. A method in accordance with claim 9 wherein said amount is about 0.3 ppm and x is 0.0025.

11. A method in accordance with claim 9 wherein said amount is about 0.5 ppm and x is 0.00295.

12. A method in accordance with claim 7 wherein M is gadolinium.

13. A method in accordance with claim 7 wherein said copper is added to the starting formulation at a weight selected to achieve said amount.

* * * * *